US010698565B2

(12) United States Patent
Cansino et al.

(10) Patent No.: US 10,698,565 B2
(45) Date of Patent: Jun. 30, 2020

(54) CONTEXT-BASED ICON FOR CONTROL VIA A TOUCH SENSITIVE INTERFACE

(71) Applicant: The DIRECTV Group, Inc., El Segundo, CA (US)

(72) Inventors: Don Eldrich Tagle Cansino, Redondo Beach, CA (US); Arpi Mardirossian, Pasadena, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 173 days.

(21) Appl. No.: 15/371,186

(22) Filed: Dec. 6, 2016

(65) Prior Publication Data

US 2018/0157399 A1    Jun. 7, 2018

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0488* (2013.01); *G06F 3/04842* (2013.01); *G06F 3/165* (2013.01)

(58) Field of Classification Search
CPC ................. G06F 3/04817; G06F 3/048–04847
See application file for complete search history.

(56) References Cited

U.S. PATENT DOCUMENTS 6,639,614 B1 * 10/2003 Kosslyn ................ G06T 11/206
345/440
7,111,242 B1    9/2006 Grooters
(Continued)

FOREIGN PATENT DOCUMENTS

KR    20080061708 A    7/2008

OTHER PUBLICATIONS

Arsan et al., "C# Based Media Center." Emerging Trends in Computing, Informatics, Systems Sciences, and Engineering. Springer New York, 2013. [https://www.researchgate.net/profile/Taner_Arsan/publication/278023810_C_Based_Media_Center/links/55796f4d08aeacff200374e9.pdf]. Retrieved on Sep. 29, 2016, 8 pages.

(Continued)

*Primary Examiner* — Keith D Bloomquist
(74) *Attorney, Agent, or Firm* — Amin, Turocy & Watson, LLP

(57) ABSTRACT

Selection of a context-based touch-sensitive icon for control of content presentation via a touch sensitive interface is disclosed. Context can be related to aspect of presented content, user profile information, historical content consumption, human interface data, etc. Context of content can be related to types, ratings, themes, metadata, etc., of content. This can enable selecting an icon that corresponds to the content being presented. Moreover, user profile data can allow more refined icon selection based on parameters that can be based on an entry of data associated with a user. Additionally, historical content consumption can act as a criterion in selecting an icon. Further, user interactions with a human interface can aid in selecting an icon based on patterns indicating aspects such as poor coordination, possible diseases/conditions associated with a user, etc. In an aspect, a caricature an icon designed for children can be selected based on children's content.

20 Claims, 10 Drawing Sheets

(51) Int. Cl.
*G06F 3/0484* (2013.01)
*G06F 3/16* (2006.01)
*G06F 3/0488* (2013.01)

(56) References Cited

U.S. PATENT DOCUMENTS

| | | | |
|---|---|---|---|
| 7,242,988 B1* | 7/2007 | Hoffberg | G05B 19/0426 |
| | | | 700/28 |
| 7,426,692 B2 | 9/2008 | Novak et al. | |
| 7,665,031 B2 | 2/2010 | Matthews et al. | |
| 7,681,128 B2 | 3/2010 | Yamamoto et al. | |
| 7,757,252 B1* | 7/2010 | Agasse | H04N 5/44543 |
| | | | 715/700 |
| 7,839,803 B1* | 11/2010 | Snelgrove | H04M 3/56 |
| | | | 370/235 |
| 7,844,661 B2 | 11/2010 | Fang et al. | |
| 7,975,241 B2 | 7/2011 | Rosen et al. | |
| 8,438,482 B2 | 5/2013 | Amarasingham et al. | |
| 8,525,787 B2 | 9/2013 | Brodersen et al. | |
| 8,839,297 B2 | 9/2014 | Brown et al. | |
| 8,892,633 B2 | 11/2014 | Park et al. | |
| 9,032,293 B2 | 5/2015 | Hill et al. | |
| 9,197,844 B2 | 11/2015 | Gardes et al. | |
| 2006/0095866 A1* | 5/2006 | Kiiskinen | G06F 3/0481 |
| | | | 715/810 |
| 2006/0184871 A1 | 8/2006 | Waters | |
| 2007/0180387 A1 | 8/2007 | Gravina et al. | |
| 2009/0265648 A1 | 10/2009 | Ryu et al. | |
| 2010/0138753 A1* | 6/2010 | Riggs | G06F 17/3089 |
| | | | 715/745 |
| 2011/0074573 A1* | 3/2011 | Seshadri | G06F 3/038 |
| | | | 340/539.13 |
| 2012/0326993 A1 | 12/2012 | Weisman | |
| 2014/0068476 A1* | 3/2014 | Kosaki | G06F 3/04817 |
| | | | 715/765 |
| 2014/0108949 A1 | 4/2014 | Murugesan | |
| 2016/0085950 A1* | 3/2016 | Chen | G06F 21/32 |
| | | | 726/28 |
| 2016/0132231 A1* | 5/2016 | Rathod | H04N 5/23216 |
| | | | 715/719 |
| 2016/0239198 A1 | 8/2016 | Shenkler | |
| 2016/0259840 A1 | 9/2016 | Zheng et al. | |
| 2017/0017365 A1* | 1/2017 | Lin | G06F 3/0484 |
| 2017/0366498 A1* | 12/2017 | Green | H04N 21/4758 |

OTHER PUBLICATIONS

Gonzales et al., "An approach to User Interface Design of an accessible user agent." Procedia Computer Science 14 (2012):254-262. [http://www.sciencedirect.com/science/article/pii/S1877050912007910]. Retrieved on Sep. 29, 2016, 9 pages.

"Skin Creation Guide." Microsoft, microsoft.com, Dec. 5, 2011. [https://web.archive.org/web/20111205151739/http://msdn.microsoft.com/enus/library/windows/desktop/dd564351(v=VS.85).aspx]. Retrieved on Sep. 29, 2016, 2 pages.

Magee et al., "HAIL: hierarchical adaptive interface layout." International Conference on Computers for Handicapped Persons. Springer Berlin Heidelberg, 2010. [https://pdfs.semanticscholar.org/5529/05c14840e1dbdb3f4e22fbb23d7d7299a216.pdf]. Retrieved on Sep. 29, 2016, 8 pages.

* cited by examiner

CONTEXT-BASED ICON FOR CONTROL VIA A TOUCH SENSITIVE INTERFACE

TECHNICAL FIELD

The disclosed subject matter relates to touch sensitive control of content presentation. More particularly, the disclosed subject matter relates to determining, based on content being presented, a multipart interface icon enabling control, via a touch sensitive display, of content presentation.

BACKGROUND

By way of brief background, conventional control interfaces for content playback typically incorporate conventional iconography to communicate command functionality in the interface. As an example, fast forward can be ">>" and rewinds can be "<<". As other examples, pause can be an almost quotation mark symbol and stop can often be a filled circle or filled octagonal symbol. These symbols can often be confusing for the uninitiated, young, or developmentally disabled. Moreover, conventional control interfaces can frequently be generic and unrelated to content being presented. Furthermore, control interfaces can lack adaptations, such as animations, that relay to a user a sense of responsiveness to an interaction with the control interface. As an example, selection of a fast forward key on a conventional interface can cause video or audio to advance at a higher than normal playback speed, however where there can be lag between pressing the fast forward symbol and actual higher than normal speed advancement of the content playback, the lag can cause confusion for a user, e.g., it can be experienced as unresponsive, can cause the user to feel like they weren't pressing in the correct portion of the control interface to activate the fast forward functionality, etc. While for normal or experienced users, this example lag can be understood to simply be part of the process of fast forwarding content, for an inexperienced, immature, etc., user, the example lag can cause uncertainty in using the control interface.

DETAILED DESCRIPTION

Figure 1:
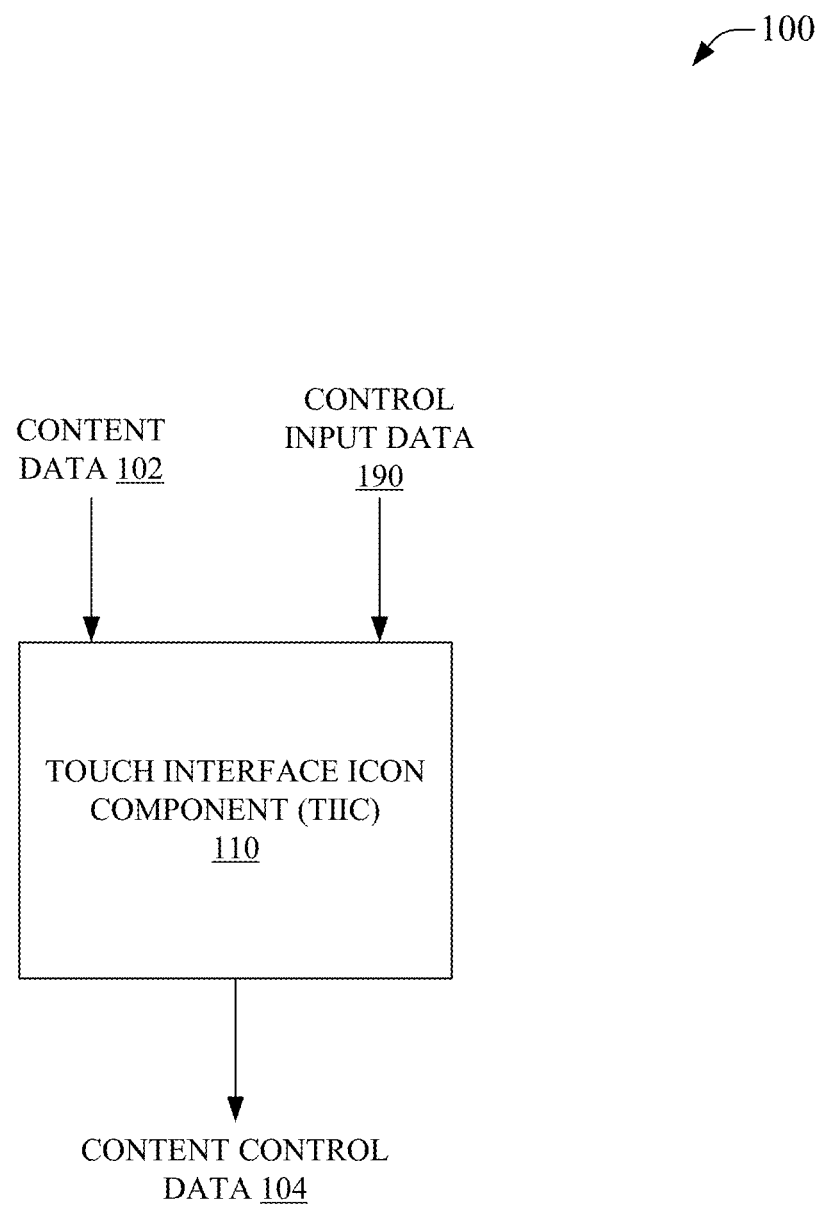
FIG. 1 is an illustration of an example system that facilitates context-based control of content presentation via a touch interface icon in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional control interfaces for control of content playback can incorporate symbols or icons, e.g., to communicate command functionality in the interface, that can be confusing to uninitiated users or users with decreased mental faculties. Moreover, conventional control interfaces can be challenging to operate for less coordinated users, e.g., young users, older users, users with physical impediments, etc. Whereas conventional control interfaces can frequently be generic and unrelated to content being presented, these control interfaces can be less engaging for certain user populations, which can result in less use and a longer learning period to master a conventional control interface. Furthermore, conventional control interfaces can lack adaptations, such as animations, that engage a user and/or relay a sense of responsiveness to a user interaction with the control interface. This lack of engagement and/or responsiveness can be experienced by the user as if they are not properly operating the control interface, causing frustration with the control interface, e.g., that the user is pressing an incorrect portion of the control interface, that they are not pressing hard enough, that they are pressing too hard, etc. While for normal or experienced users, these quirks of conventional control interfaces can be attributed to understandable causes, e.g., processing time, bandwidth, travel time between a local device and a server, etc., for an inexperienced user, immature user, developmentally delayed user, etc., conventional control interfaces can cause uncertainty in using the control interface and can be less engaging.

The instant disclosure seeks, in an aspect, to employ a more context-based touch interface icon to better engage a user, provide improved operability to a user, allow customization of the touch interface icon, etc., thereby providing a more useful and effective touch interface for controlling content presentation. In an aspect, the touch interface icon, hereinafter icon or TII, can be context based. The context can relate to content being currently presented. As an example, where the content is a movie, which is being played on a tablet computer with a touch sensitive interface, a Motion Picture Association of America (MPAA) rating can be used as a criterion in selecting an icon, such that where the movie is "G" rated, the icon can be 'family friendly', such as a cartoon-style bear face, and where the movie is "R" rated, the icon can be more adult, such as a stylized representation of a character from the movie. As another example, a theme of the movie, such as can be extracted from analysis of a movie abstract, metadata, movie reviews, etc., can be another criterion for selecting an icon, such as, a Bugs Bunny cartoon can suggest a stylized rabbit icon, a Transformers movie can suggest a stylized robot icon, a Harry Potter movie can suggest a stylized owl icon, etc.

In another aspect, the context can relate to a user preference, such as can be stored in response to an input into a user profile. In this aspect, a user profile can comprise user preference data that can be employed in selecting a TII. As an example, a user profile can comprise an age of a user associated with the user profile, such that where content is being presented on a device employing the user profile, the user age can be a criterion in selecting an icon, for instance, a five-year old user can be associated with stylized icons that embody simple or basic facial or anatomical features, large touch areas for command/control due to undeveloped manual dexterity, fewer functions based on less developed mental faculties, etc., while a 15-year old user can be associated with icons having more detailed-oriented styles, more functionality incorporated, more precise touch points for command/control attributed to high levels of manual dexterity, etc., and a 95-year old user can be associated with detailed icons having moderate functionality with larger touch points for command/control to compensate for decreasing manual dexterity attributable to age. User preference data can further comprise indications as to mental disability and/or physical disability that can be employed in selecting an icon. User preference data can additionally comprise nearly any other value to relay an aspect of a user associated with the user profile to enable selection of an icon based on that value as a criterion, for example, gender identity, color preference(s), favorite/disliked animal(s), favorite/disliked song(s), favorite/disliked character(s), favorite/disliked food(s), age, nationality, ethnicity, location/region, phobia(s), likes/dislikes, abilities/disabilities, school(s), sport team(s), etc.

In a further aspect, the context can relate to historical content consumption data. In this aspect, content that has previously been consumed can be an indicator in selection of a TII for control of current content. As an example, historical content consumption can indicate that a device comprising a touch sensitive interface recently consumed fifty episodes of Dora the Explorer, which can facilitate selection of an icon that can be a stylized representation of a character, or portion of a character, from the Dora the Explorer franchise, such as Dora's face, Swiper, etc. As another example, where TED talks are frequently consumed in comparison to other content, this information can be a criterion in selecting an icon, such as a personified "TED" icon with features such as eyes, ears, mouth, feet, or further stylization to include elements like a tail, etc.

In another aspect, human interface data can be communicated as a context. As such, human interface data can be employed as a criterion in selecting a TII. Human interface data can comprise information, such as but not limited to, use patterns, error patterns, frequently used features, etc. As an example, human interface data can indicate that of ten features present in previous icons, three features are frequently used, five features are moderately used, and two features are rarely or never used. This information can be used to, for example, select an icon that does not employ the two rarely/never used features, select an icon where the touch location/size for the less used features allows them to be more easily selected, select an icon where the touch location/size for the less used features make them less easily selected in favor of allowing other functions to be more easily selected, etc. In another example, a child user can lack manual dexterity resulting in historically jerky selection/movement of a portion of an icon related to volume control, this human interface data can be employed to select an icon adapted to be more forgiving of users with lower manual dexterity. Further, as the child develops more manual dexterity, this change in ability can be a criterion for selecting an icon that is adapted to more refined selection/movement.

In some embodiments of this disclosure, the TII can be resized. This can allow the icon to take up, overlay, etc., more or less of an available touch sensitive display area. Resizing can be based on context, e.g., criteria as disclosed herein. Additionally, an icon size can be set in a settings menu or preference area. Further icon size/scale can be adapted manually, e.g., by 'grabbing' a corner of the icon and dragging it to a new size or scale, wherein grabbing can be touch and hold before moving, double tapping before moving, or nearly any other technique for designating resizing or the icon. As an example, an adult with good dexterity can typically employ a smaller icon than a child with poor dexterity and, accordingly, the adult can scale an icon to consume less display area in comparison to a larger scaled icon employed by a child user.

The presently disclosed subject matter is herein below disclosed largely in the context of child-friendly icons simply for the sake of clarity and brevity. It is noted however, that the disclosed subject matter can be employed in nearly any other context, even where, for the sake of clarity and brevity, these other contexts are not explicitly disclosed herein.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which facilitates context-based control of content presentation via a touch interface icon in accordance with aspects of the subject disclosure. System 100 can include touch interface icon (TII) component (TIIC) 110. TIIC 110 can determine content control data 104 to enable control of presented content, e.g., fast forward with or without thumbnail screen shots (hereinafter 'fast forward' unless explicitly stated otherwise), reverse with or without thumbnail screen shots (hereinafter 'reverse' unless explicitly state otherwise), increased/decreased play speed, skip forward/backward, pause, play, volume up/down/mute, etc. Content control data 104 can be employed by a content playback device to control playback of content in accordance with content control data 104. In an aspect, content can be audio, video, audio-video, etc.

In an aspect, TIIC 110 can receive content data 102. Content data 102 can be data related to content being presented. Content can be presented by a device comprising a touch sensitive interface or can be device communicatively coupled to a device comprising a touch sensitive interface. As examples, content can be presented by a tablet computer comprising a touch sensitive display, by a laptop computer having a touch sensitive display, by a smart television communicatively coupled to a smartphone having a touch sensitive display, by a ROKU, APPLE TV, or CHROMECAST device communicatively coupled to a smartphone having a touch sensitive display, by a BLU-RAY device communicatively coupled to a tablet computer having a touch sensitive display, etc. Content data 102 can comprise information related to the content being presented, such as MPAA rating information, metadata, reviews, etc. Content data 102 can be analyzed, or otherwise employed, by TIIC 110 to determine a criterion that can be employed in determining an icon that can be displayed on touch sensitive display to enable receiving an input, e.g., a user touch, a stylus touch, etc., to portions of the icon that correspond to command/control of content being presented. As an example, content data 102 can indicate, e.g., via metadata, that content currently be in presented is Halloween themed, whereby TIIC 110 can present a stylized jack-o-lantern icon on a touch sensitive display, whereby touching the eye portion of the jack-o-lantern icon corresponds to scrubbing through thumbnails of the content being presented, e.g., touching the eyes and sliding right can scrub forward, touching the eyes and sliding left can scrub in reverse, etc. Similarly, in this example, touching the mouth of the jack-o-lantern icon can relate to volume control, e.g., left/right or up/down movement of a touch starting at the mount can increase/decrease the volume. Numerous other command/control functions can be embodied in other areas and actions with the example jack-o-lantern that is selected based on the Halloween theme comprised in content data 102.

TIIC 110 can further receive control input data 190. Control input data 190 can comprise data from a touch screen, or device comprising a touch screen, that is related to a touch, or motion starting with a touch, of a portion of a TII. As illustrated herein above, a touch of the example jack-o-lantern eye portion can be embodied in control input data 190 and be thereby received by TIIC 110 to determine content control data 104 that enables scrubbing (forward/backward depending on the example subsequent motion starting with the touch of the eye portion). Moreover, TIIC 110 can adapt the icon based on control input data 190. In an embodiment, the animation can provide nearly instant feedback that a portion of the icon is being interacted with, which can compensate for possible lag in effecting the actual control of the content being presented. As an example, touching the eyes of the example jack-o-lantern can result in TIIC 110 adapting the icon to cause the jack-o-lantern to 'squint' in response to the touch, indicating to a user that the eyes have been touched. Subsequent movement of the touch can result in scrubbing forward or backward, however, even where delay in scrubbing is experienced, the 'squinting' of the jack-o-lantern reinforces to a user that the proper function has been engaged. This can bolster confidence in less experienced or more immature users. In some embodiments, adapting the icon can comprise animation of the icon or portions thereof, adapting color(s) of the icon, adapting size/scale of the icon, changing an appearance of the icon, adding or removing visual elements to the icon, etc.

In some embodiments, though not illustrated in system 100, user preference data, historical content consumption data, or human interface data, can also be received by TIIC 110. As stated hereinabove, this information can be employed in selected an icon by TIIC 110 that can facilitate user interaction. This user interaction, e.g., represented by control input data 190, can enable TIIC 110 to generate content control data 104, adapt the icon concurrently, etc. As an example, user preference data can indicate that a child is using the device, content data 102 can indicate that a G-rated cartoon is being played, and that the cartoon is MICKEY MOUSE themed. Based on this, TIIC 110 can select a MICKEY MOUSE stylized face icon, wherein the ears area associated with volume adjustment, the nose with pause/play functionality, a tail with scrubbing forward/backward, and the mouth with returning to a higher-level menu. The example icon can be presented at 150% normal size, e.g., scaled up, to allow easier use by a child. Moreover, the example icon can receive a touch and drag of the 'tail,' which can be embodied in control input data 190, allowing TIIC 110 to generate content control data 104 comprising an indication to scrub forward/backward, depending on the direction in which the 'tail' is dragged. Wherein the content presentation device receives content control data 104 from the example, scrubbing can ensue. Moreover, TIIC 110 can animate the icon in a manner that moves the tail in accord with the motion of the example drag, providing feedback to the child user that the input of 'moving the tail to scrub in the video' has been received via the touch interface displaying the icon.

In some embodiments, TIIC 110, a content source, e.g., 306, etc., or a touch sensitive display, e.g., 350, etc., can be located separately. As an example, a touch sensitive display can be a smart TV located at a residence, TIIC 310 can be located at a server of a network provider, such as AT&T, VERIZON, etc., and the content source can be a virtualized content server operated by third party entity, such as YOUTUBE, NETFLIX, etc. In other embodiments, TIIC 110, a content source, or a touch sensitive display, can be located together, e.g., local to each other, in the same device, etc. For example, a tablet computer can comprise a touch sensitive display, TIIC 110, and memory storing content, e.g., a content source. In another example, a user residence can have a local network interconnecting a media server device comprising TIIC 110, and a laptop computer comprising a touch sensitive display. Numerous other permutations are to be readily appreciated, and are within the scope of the instant disclosure, although not recited for the sake of clarity and brevity.

Figure 2:
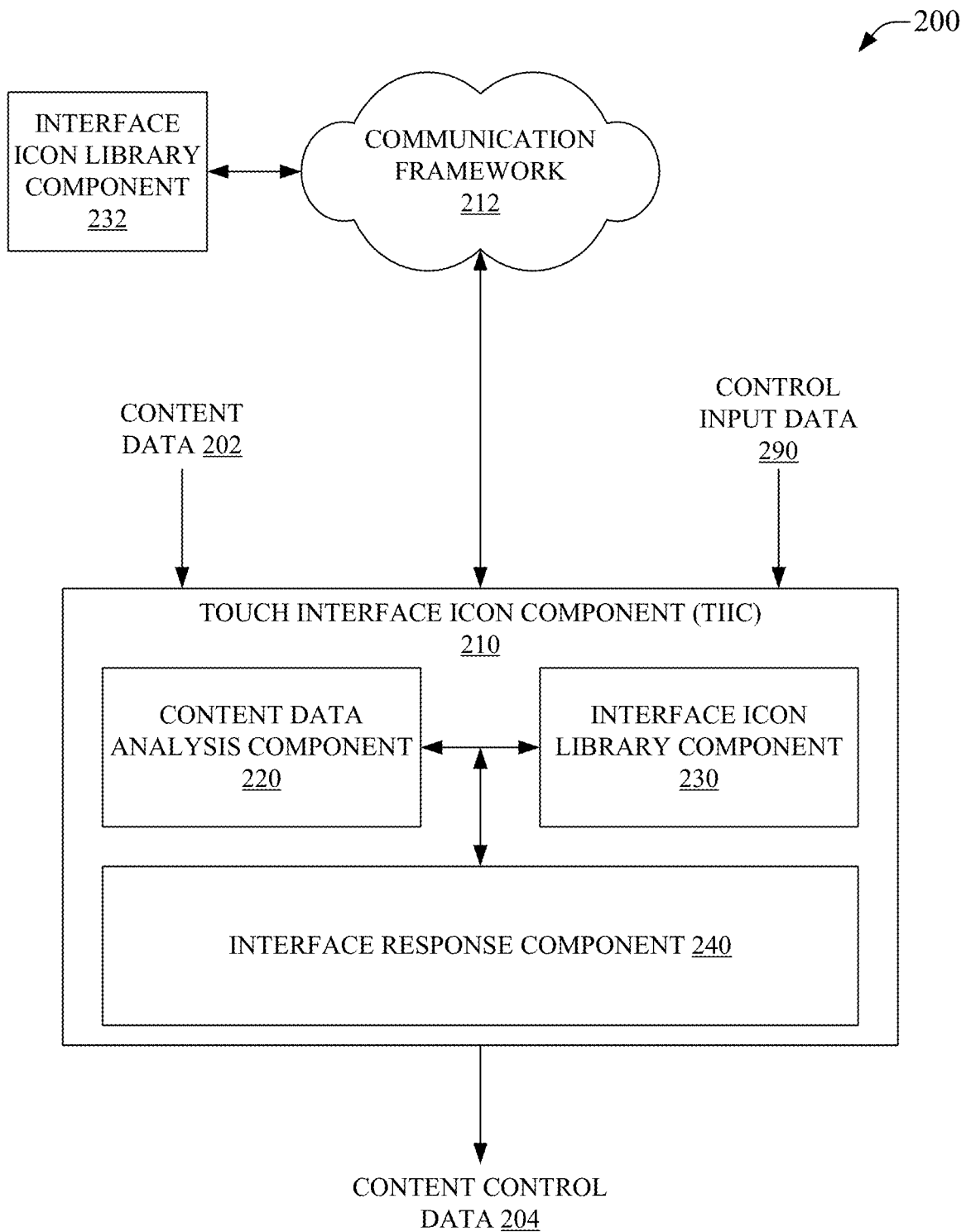
FIG. 2 is a depiction of an example system that facilitates context-based control of content presentation via a library of touch interface icons in accordance with aspects of the subject disclosure.

FIG. 2 is a depiction of a system 200 that can facilitate context-based control of content presentation via a library of touch interface icons in accordance with aspects of the subject disclosure. System 200 can comprise TIIC 210. TIIC 210 can determine content control data 204 to enable control of presented content. Content control data 204 can be employed by a content playback device to control playback of content in accordance with content control data 204.

TIIC 210 can comprise content data analysis component 220. Content data analysis component 220 can analyze content data, e.g., content data 204, etc., received by TIIC 210 to determine a criterion related to selection of an icon that can be presented via a touch sensitive display to enable control of content based on an input to a portion of the touch sensitive display associated with a portion of the icon.

In an aspect, TIIC 210 can receive content data 202. Content data 202 can be data related to content being presented. Content can be presented by a device comprising a touch sensitive interface or can be a device communicatively coupled to a device comprising a touch sensitive interface. Content data 202 can be analyzed, or otherwise employed, by TIIC 210 to determine a criterion that can be employed in determining an icon that can be displayed on touch sensitive display to enable receiving an input to portions of the icon that correspond to command/control of content being presented.

TIIC 120 can further comprise interface icon library component 230. Interface icon library component 230 can comprise one or more icons that can be selected from based on analysis of content data 202 via content analysis component 220. A selected icon can be presented via a touch sensitive display by interface response component 240. In an embodiment, interface icon library component 230 can further select an initial scale of the icon. Moreover, interface response component 240 can facilitate adapting the scale of the icon in response to receiving a corresponding touch/motion via the touch sensitive display, e.g., via control input data 290, etc.

TIIC 210 can receive control input data 290. Control input data 290 can comprise data from a touch sensitive display, or device comprising a touch sensitive display, that is related to a touch, or motion starting with a touch, of a portion of a presented icon. As an example, a touch of an upper left hand corner of a presented 'piggy' icon, followed by a drag can be associated with rescaling the piggy icon to a different size, such as in FIG. 3, etc. This example touch and motion can be embodied in control input data 290 and be thereby received by TIIC 210, which, via interface response component 240, can facilitate adapting the piggy icon to a new scale corresponding to the extent of the touch and motion. In an embodiment, the adaptation, e.g., the scaling to a different icon size, etc., can be animated to provide feedback reinforcing the user that the interaction is with a correct portion of the icon. This can increase user confidence, especially for less experienced, immature, or disadvantaged users.

In some embodiments, interface icon library component 232 can be included in system 200. Interface icon library component 232 can be the same as, or similar to interface icon library component 230. In an aspect, interface icon library component 232 can be located remotely from TIIC 210 and be communicatively coupled to TIIC 210 via communications framework 212. Communications framework 212 can comprise wired or wireless network devices, for example, TIIC 210 can be comprised in a smartphone and interface icon library component 232 can be comprised on a network service, whereby communications framework 212 can comprise a radio access network element, a wireless carrier backhaul element, and a wired connection to a server housing interface icon library component 232. Placement of interface icon library component 232 remote from TIIC 210, in some embodiments, can enable larger repositories of available icons than can be stored on interface icon library component 230, e.g., in many mobile devices memory is much more limited than on a server at the same price point. As such, in some embodiments, TIIC 210 can comprise interface icon library component 230 and additionally be communicatively coupled to interface icon library component 232, which embodiments can cache some icons local to TIIC 210 while being able to access other icons via interface icon library component 232. In these embodiments, the cached icons can be updated to keep a determined number of relevant icons local, as an example, where a parent is beginning to allow their young child use of a tablet computer, interface icon library component 230 can be updated to start to include child-relevant icons. In an aspect, interface icon library component 230 can be updated via interface icon library component 232.

In a further aspect, interface response component 240 can analyze control input data 290 to determine a command or control represented in control input data 290. The analysis can be employed in determining content control data 204, corresponding adaptation of the icon, etc. In an embodiment, the analysis of control input data 290 can enable determination of a command or control based on imperfect data. As an example, where a user has poor motor skills, a touch and drag motion to the mouth that, for example, is associated with adjusting the volume of content being presented, can comprise irregular motion, multiple taps from shaking hands or tremors, etc. These less than perfect touches and motion can be determined by interface response component 240, to suggest or infer volume control. The determination or inference, in some embodiments, can be trained, e.g., interface response component 240 can be set to training mode, or given a set of training data, allowing entry of data for less than perfect touches and motions correlated to designated commands and controls. Moreover, interface response component 240 can learn, e.g., outside of a strict training mode, from repetitive user touches and motions. As an example, where a user has cerebral palsy, certain departures from perfect touches and motions can be experienced through repeated use of the icon for content control. Interface response component 240 can adapt response based on learning the particular departures for a user. Moreover, as the departures can change over time, perhaps as a condition or disease progresses, interface response component 240 can continue to adapt interpretation of control input data 290 into content control data 204.

Figure 3:
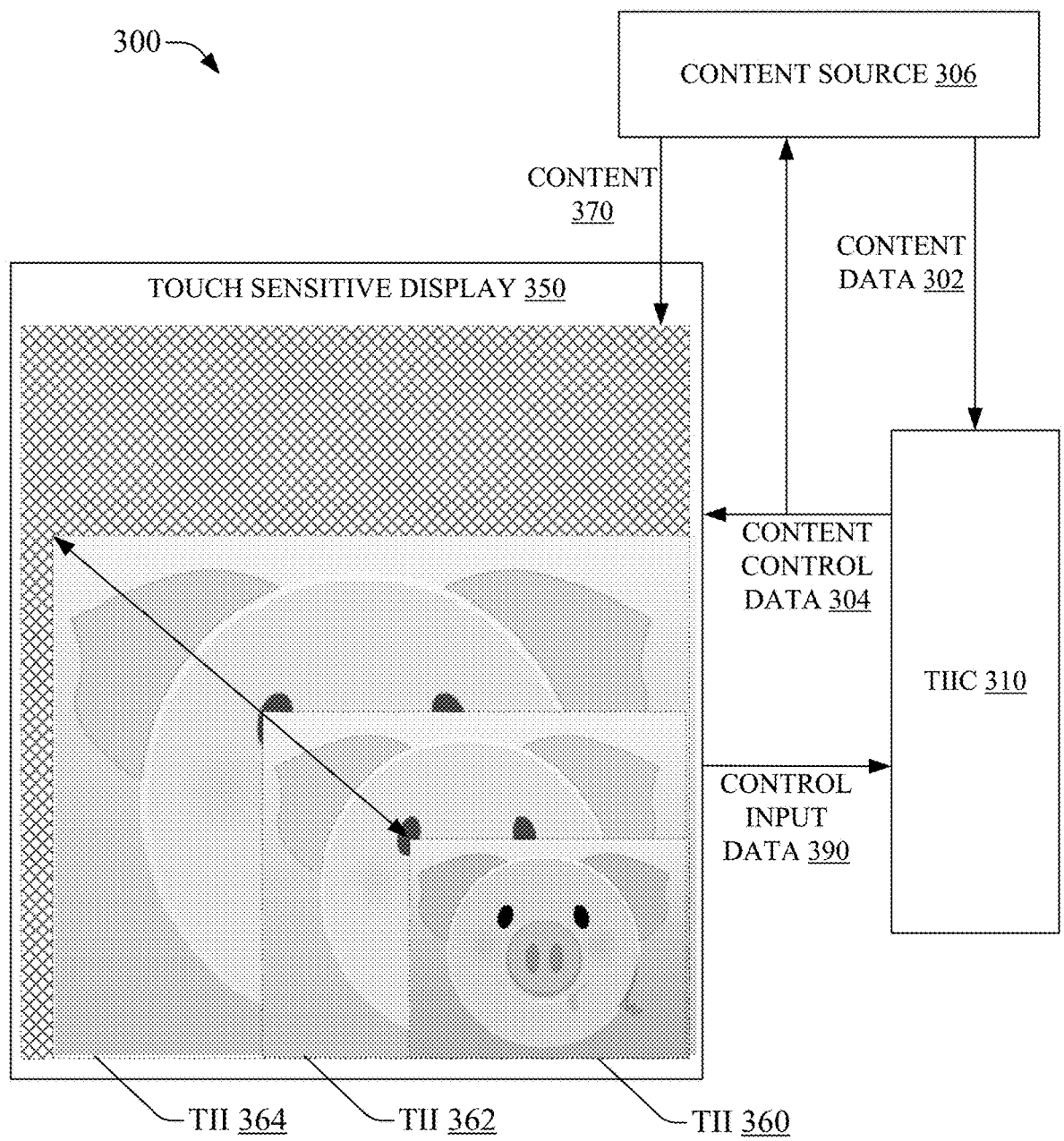
FIG. 3 illustrates an example system that facilitates context-based control of content presentation via a variable-scale touch interface icon in accordance with aspects of the subject disclosure.

FIG. 3 illustrates a system 300 that facilitates context-based control of content presentation via a variable-scale touch interface icon in accordance with aspects of the subject disclosure. System 300 can comprise TIIC 310. TIIC 310 can determine content control data 304 to enable control of presented content, e.g., content 370. Content control data 304 can be employed by content source 306 to control playback of content 370 in accordance with content control data 304. In an aspect, content source 306 can be a smartphone, laptop computer, tablet computer, smart TV, streaming device such as ROKU, APPLE TV, CHROMECAST, etc., or any other source of audio content, video content, audio-video content, etc.

In an aspect, TIIC 310 can receive content data 302 from content source 306. Content data 302 can be data related to content 370 being presented, via touch sensitive display 350, by content source 306. In an aspect, content device 306 can be a device comprising a touch sensitive interface or can be a device communicatively coupled to a device comprising a touch sensitive interface. Content data 302 can be analyzed, or otherwise employed, by TIIC 310 to determine a criterion that can be employed in determining an icon that can be displayed on touch sensitive display 350 to enable receiving an input, e.g., a user touch, a stylus touch, etc., to portions of the icon that correspond to command/control of content 370 being presented via touch sensitive display 350, or via a display device communicatively coupled to touch sensitive display 350 (not illustrated). These command/control inputs can be embodied in control input data 390.

TIIC 310 can receive control input data 390. Control input data 390 can comprise data from touch sensitive display 350, or a device comprising touch sensitive display 350, that is related to a touch, or motion starting with a touch, of a portion of an icon. As illustrated herein above, a touch of the example jack-o-lantern eye portion can be embodied in control input data 390 and be thereby received by TIIC 310 to determine content control data 304 that enables scrubbing (forward/backward depending on the example subsequent motion starting with the touch of the eye portion). Moreover, TIIC 310 can adapt the presented icon, e.g., 360 based on control input data 390. In an embodiment, the animation can provide feedback that a portion of the icon is being touched. As an example, touching the eyes of the example jack-o-lantern can result in TIIC 310 adapting the icon to cause the jack-o-lantern to 'blink' in response to the touch, indicating to a user that the eyes have been touched. The 'blinking' of the jack-o-lantern reinforces to a user that the proper function has been engaged. This can raise the confidence of less experienced or immature users. Subsequent movement of the touch can result in scrubbing forward or backward through content 370, accordingly. In some embodiments, adapting the icon can comprise animation of the icon or portions thereof, adapting color(s) of the icon, adapting size/scale of the icon, changing an appearance of the icon, adding or removing visual elements to the icon, etc.

Adaptation of the icon can, in some embodiments, comprise adapting a scale or display size of the icon. TII 360 illustrates the icon at a first scale, and TII 362 and 364 at two other scales. The scales can be transitioned, for example, by touching and dragging a corner area of the icon in the direction of the target scale, e.g., larger or smaller. In an aspect, this can enable the icon to be adapted to a display size that can accommodate different users. As an example, a child or elderly person can desire the icon at TII 364 due to lower dexterity levels, eyesight issues, etc., in comparison to a teenager that can prefer the icon at TII 360.

Figure 4:
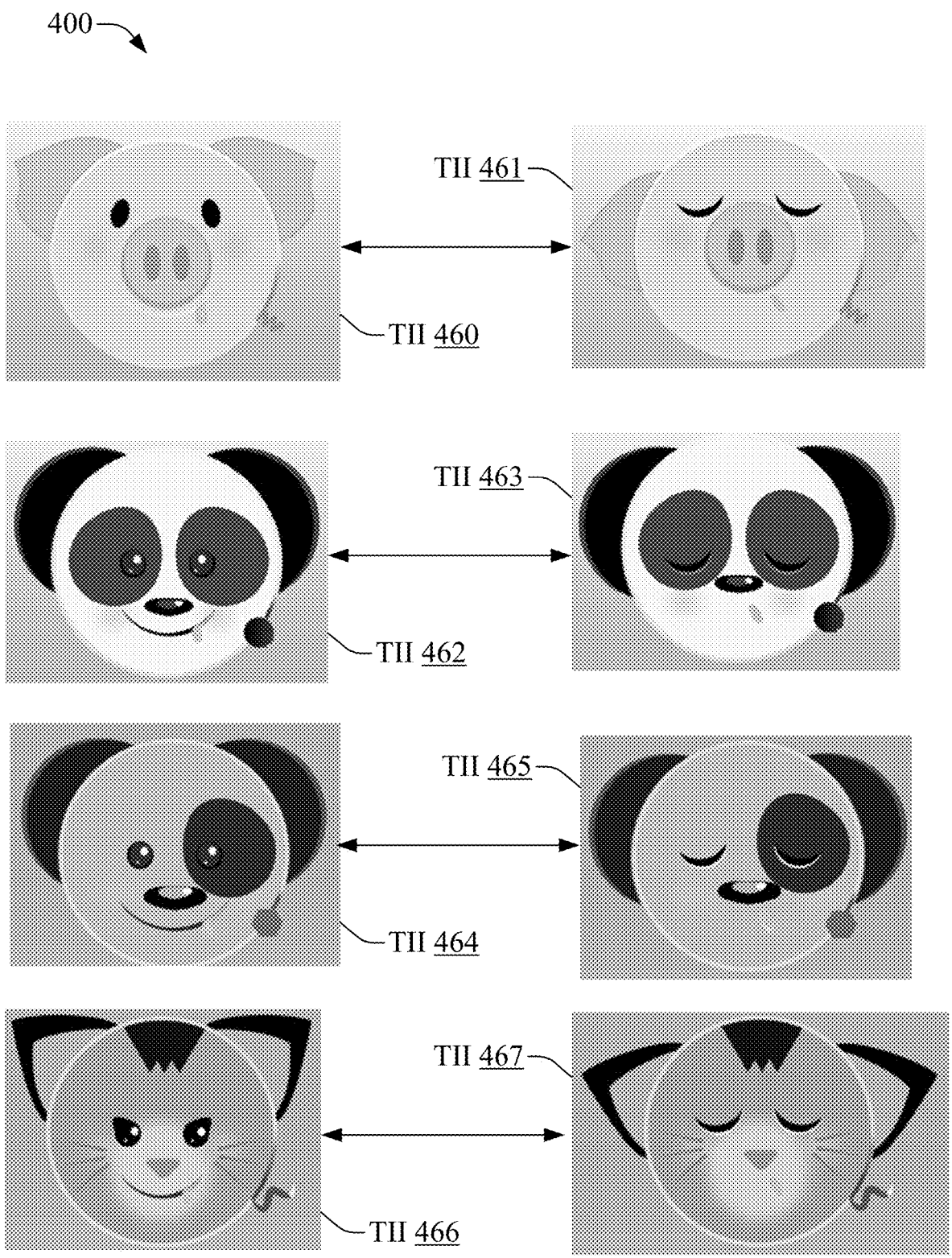
FIG. 4 illustrates examples of touch interface icons that facilitate context-based control of content presentation in accordance with aspects of the subject disclosure.

FIG. 4 illustrates examples 400 of touch interface icons that facilitate context-based control of content presentation in accordance with aspects of the subject disclosure. Examples 400 can include icons 460-467. TII 460-467 can be stylized caricatures of animals, e.g., pig, panda, bear, cat, etc., having command/control functionality associate with portions of the icons. As an example, the eyes, or regions around the eyes, of the animal caricatures can be associated with scrubbing content, fast forwarding content, rewinding content, etc. In some embodiments, touching and holding the right eye can fast forward and touching and holding the left eye can rewind. In some embodiments, the touching an eye region and sliding the touch either left or right can fast forward or reverse content. In some embodiments, the touch can result in control input date, e.g., 190, 290, etc., that can be analyzed to generate corresponding content control data 104, 204, etc. In some embodiment, interaction with the icon can be associated with adapting the icon, for example, touching the eye area of TII 460 can cause the eyes to blink, e.g., TII 461, concurrently with generating content control data to facilitate the command/control associate with touching the eye region. In some embodiments, releasing a touch can result in further animation, e.g., ending the blink and returning to an open eye, such as from TII 461 to TII 460.

The example animal caricatures, e.g., 460-467, can further comprise other touchable portions assigned to other commands/controls. As an example, the ears can be associated with control of volume, the tails can be associated with playback speed, the nose can be associated with pause and resumption of playback, the mouth can be associated with subtitles, the forehead can minimize the icon which can be brought back by tapping the content, the icon can be resized by interaction with a corner or edge of the icon, the icon can be moved about the display area by dragging and dropping, etc. It will be observed that the animal caricature icons can lend themselves to children, however other icons are within the scope of the present disclosure despite not being explicitly recited for the sake of brevity and clarity. Moreover, the selection of an animal caricature icon can be context-based, e.g., where the content is a kid-friendly movie about farm animals, TII 460/461 can be selected, where the content is about China TII 462/463 can be selected, where the content is about bed time the teddy bear TII 464/465 can be selected, where the content is about saving animals from the city pound the cat icon, TII 466/467 can be selected, etc.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
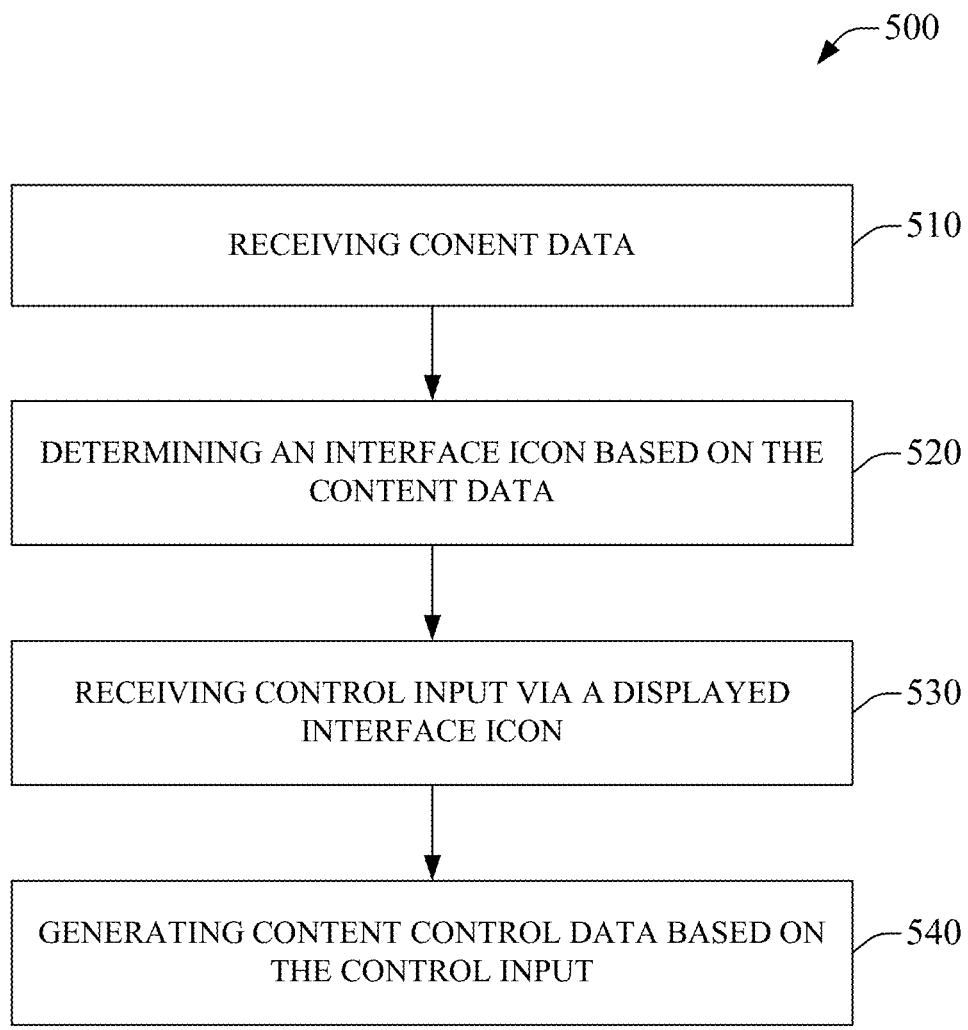
FIG. 5 illustrates an example method facilitating context-based control of content presentation via a touch interface icon in accordance with aspects of the subject disclosure.

FIG. 5 illustrates a method 500 that facilitates context-based control of content presentation via a touch interface icon in accordance with aspects of the subject disclosure. At 510, method 500 can comprise receiving content data. Content data can comprise data related to content being presented. Content can be presented by a device comprising a touch sensitive interface or can be device communicatively coupled to a device comprising a touch sensitive interface. Content data comprising information related to the content being can include MPAA rating information, metadata, abstracts, reviews, play length, copyright date, content source information, or nearly any other information related to the content being presented.

At 520, method 500 can comprise determining an interface icon based on the content data received at 510. Content data can be analyzed to determine a criterion that can be employed in determining an icon that can be displayed on touch sensitive display to enable receiving an input, e.g., a user touch, a stylus touch, etc., to portions of the icon that correspond to command/control of content being presented. As an example, content data can indicate that the content is produced by WALT DISNEY STUDIOS, whereby an icon can be selected that is a stylized version of a DISNEY character or portion thereof, for example, the face of Pinocchio, a Magic Mirror, etc.

Method 500, at 530, can comprise receiving control input via a displayed interface icon. The interface icon, e.g., TII or icon, can be displayed via a portion of a touch sensitive display. Touching a portion of the touch sensitive display associated with a portion of the icon mapped to a command or control can result in generating associated content control data. In an aspect, receiving the control input via the icon displayed on a touch sensitive display can result in a signal that can be received by a device, e.g., TIIC 110, 210,310, etc., where the input command can be analyzed. The analysis can, at 540, result in generating content control data based on the control input. At this point method 500 can end. Numerous command/control functions can be embodied in different areas of the selected icon. In some embodiments, the different areas can overlap or an area can be within another area, for example, the eye area can extend across the forehead area such that a touch and drag in the eye area transitions the forehead area but is regarded as within the eye area, while in contrast, touching the forehead area is regarded as distinct from touching the eye area. In an aspect, some icons can have more or fewer command/control portions that other icons. In another aspect, some icons can be more or less complex or detailed than other icons. These aspects can allow selecting an icon based on an expected audience, e.g., based on what content is being presented, user profile data, historical consumed content for a device or user profile, human interface data, etc.

Figure 6:
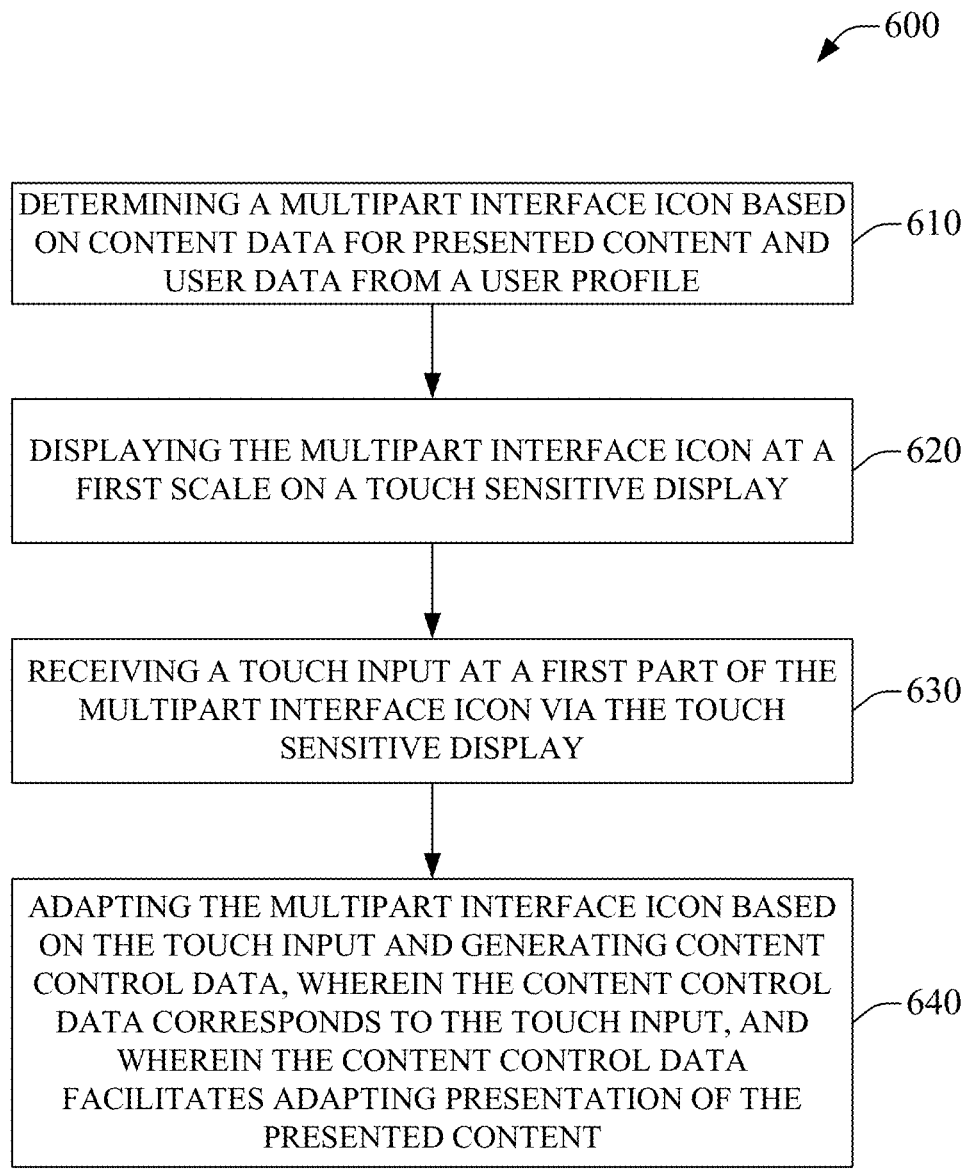
FIG. 6 illustrates an example method facilitating context-based control of content presentation via interaction with a portion of a multipart interface icon in accordance with aspects of the subject disclosure.

FIG. 6 illustrates a method 600 facilitating context-based control of content presentation via interaction with a portion of a multipart interface icon in accordance with aspects of the subject disclosure. At 610, method 600 can comprise determining a multipart interface icon based on content data for presented content and user data from a user profile. A multipart interface icon can be the same as, or similar to, a touch interface icon, or an icon as disclosed elsewhere herein. In an embodiment a multipart interface icon can be an larger icon comprising other smaller icons at portions of the larger icon, e.g., a small icon for each eye, an icon for the face, an icon for the mouth, an icon for the tail, etc., that when combined appear to be a larger icon similar to those disclosed elsewhere herein. Selection of a portion of a touch interface icon can correspond to selection of a smaller icon in a multipart interface icon.

At 620, method 600 can comprise displaying the multipart interface icon at a first scale on a touch sensitive display. The displayed multipart interface icon can be overlaid on currently presented content, can be displayed in a portion of the touch sensitive display that can overlap in part the currently presented content, or can be displayed in a separate area not overlapping the currently played content, e.g., in a manner that is the same as, or similar to, display of a touch interface icon as disclosed herein. In some embodiments, the multipart interface icon can be resized or scaled to a different size.

Method 600, at 630, can comprise receiving a touch input at a first part of the multipart interface icon via the touch sensitive display. A touch input can be a touch with a finger or other body part, a touch with a stylus, a touch with another object, etc. The touch input to the touch sensitive display can correspond to a first part of the multipart interface icon as displayed. As an example, a touch at first part of the touch sensitive display can be associated with touching an eye of a displayed multipart interface icon, while a touch at a second part of the touch sensitive display can be associated with touching a tail of the multipart interface icon as displayed.

At 640, method 600 can comprise adapting the multipart interface icon based on the touch input and generating content control data. At this point method 600 can end. The content control data can correspond to the touch input. The content control data can facilitate adapting the presentation of the content being presented. As an example, a touch that correlates to a 'volume up' command can result in the volume of the content being increased.

Figure 7:
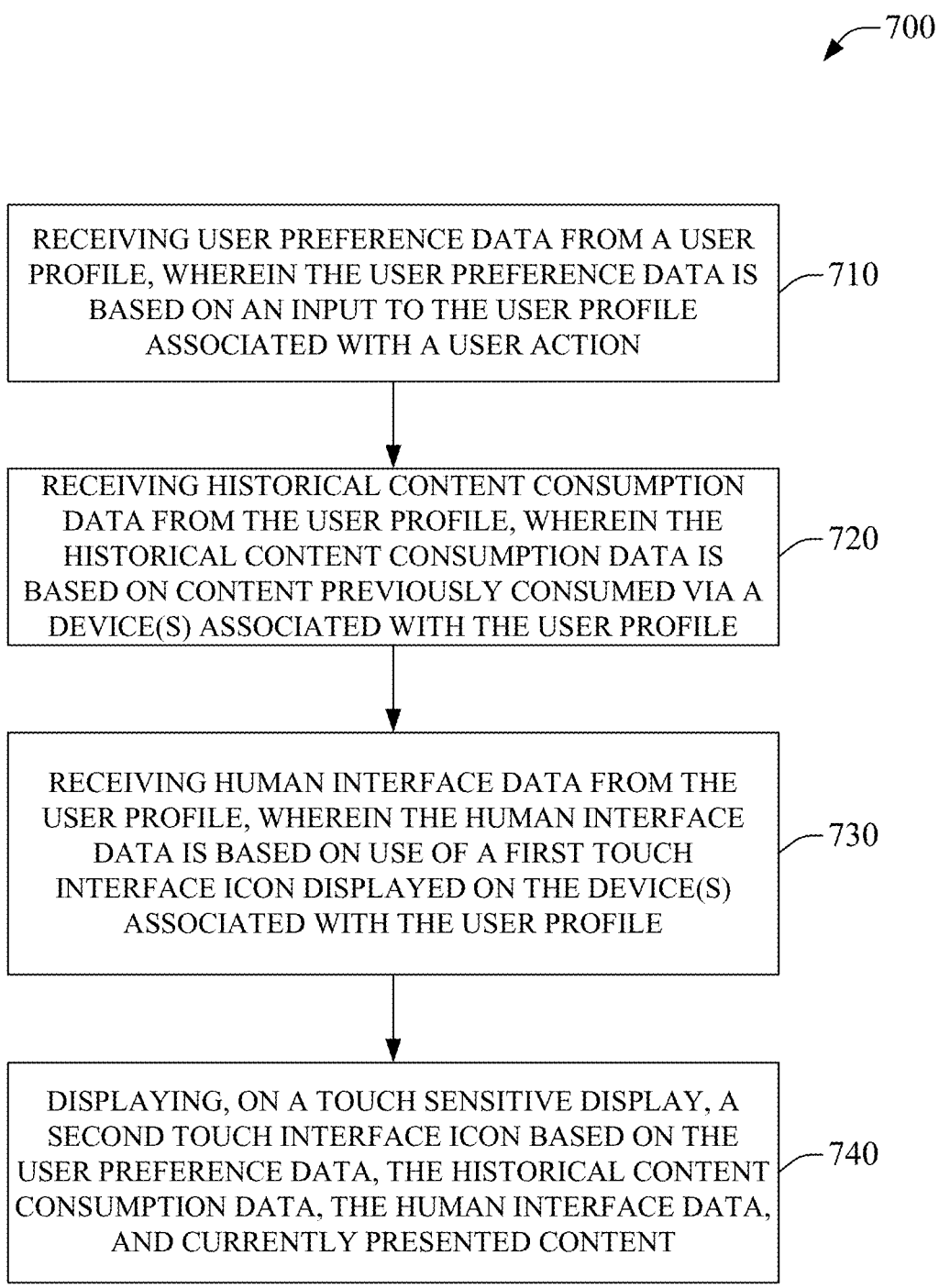
FIG. 7 depicts an example method facilitating context-based control of content presentation based on user preference data, historical content consumption data, human interface data, and currently presented content, in accordance with aspects of the subject disclosure.

FIG. 7 illustrates a method 700 that facilitates context-based control of content presentation based on user preference data, historical content consumption data, human interface data, and currently presented content, in accordance with aspects of the subject disclosure. At 710, method 700 can comprise receiving user preference data from a user profile. The user preference data can be based on an input to the user profile associated with a user action. A user profile can comprise user preference data that can be employed in selecting an icon. As an example, a user profile can comprise a gender identity of a user associated with the user profile, such that where content is being presented on a device employing the user profile, the user gender identity can be a criterion in selecting an icon, for instance, a user that identifies as female can be associated with stylized icons that embody generally feminine anatomical features, etc., while a user that identifies as male can be associated with icons having male features, etc., and a user that identifies as neither male or female can be associated with icons having gender neutral features, etc. User preference data can further comprise indications as to mental disability and/or physical disability that can be employed in selecting an icon, for example, a user can be identified as a partial amputee such that the icon selected can be amputee friendly, e.g., larger touch areas to accommodate lack of fingertips, perhaps an empowering partial amputee caricature, etc. User preference data can additionally comprise nearly any other value to relay an aspect of a user associated with the user profile to enable selection of an icon based on that value as a criterion, for example, color preference(s), favorite/disliked animal(s), favorite/disliked song(s), favorite/disliked character(s), favorite/disliked food(s), age, nationality, ethnicity, location/region, phobia(s), likes/dislikes, abilities/disabilities, school(s), sport team(s), etc.

At 720, method 700 can include receiving historical content consumption data from the user profile. The historical content consumption data can be based on content previously consumed via a device(s) associated with the user profile. Previously consumed content can be an indicator in selection of an icon for control of current content. As an example, historical content consumption can indicate that a device comprising a touch sensitive interface recently consumed 20 hours of YOUTUBE content, which can facilitate selection of an icon that can be a stylized representation of a YOUTUBE logo, emblem, etc. As another example, where jazz music is frequently consumed in comparison to other content, this information can be a criterion in selecting an icon, such as a personified saxophone or guitar icon with features such as eyes, ears, mouth, feet, or further stylization. In some embodiments, the historical content consumption can be from a device rather than the user profile.

At 730, method 700 can comprise receiving human interface data from the user profile. The human interface data can be based on use of a previous iteration of an icon displayed on the device(s) associated with the user profile. Human interface data can be employed as a criterion in selecting an icon. Human interface data can comprise information, such as but not limited to, use patterns, error patterns, frequently used features, etc. As an example, human interface data can indicate frequent errors in selecting a function where two portions of the previous icon iteration are located close together, which information can be used to, for example, select an icon that does not employ the two portions as closely located, etc. In another example, a child user can lack manual dexterity resulting in much less accurate selection of a portion of the previous iteration of the icon, for example, related to volume control, this human interface data can be employed to select an icon adapted to be more forgiving of users with lower manual dexterity. Further, as the child develops more manual dexterity, this change in ability can be a criterion for selecting an icon that is adapted to more refined selection/movement.

At 740, method 700 can comprise displaying a second icon on a touch sensitive display, wherein the second icon is based on the user preference data, the historical content consumption data, the human interface data, or the currently presented content. At this point method 700 can end. The displayed second icon can be resized or scaled. The displayed second icon can be adaptable, e.g., animated in response to touch input. The displayed second icon can be based in part on the currently presented content in addition to criteria associated with user preference data, the historical content consumption data, or the human interface data, or combinations thereof.

Figure 8:
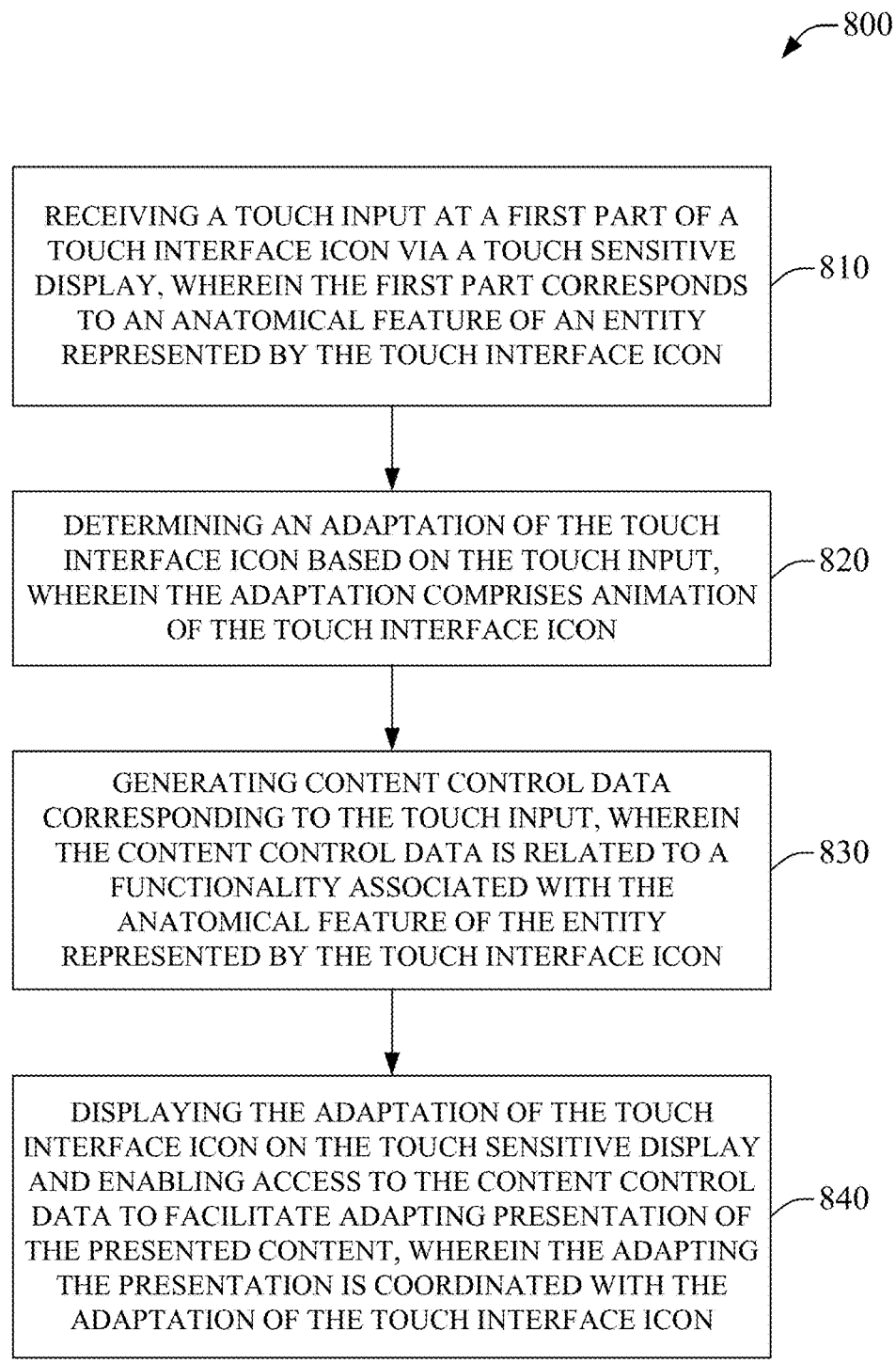
FIG. 8 illustrates an example method facilitating context-based control of content presentation comprising adaptation of a multipart interface icon in accordance with aspects of the subject disclosure.

FIG. 8 illustrates a method 800 that facilitates context-based control of content presentation comprising adaptation of a multipart interface icon in accordance with aspects of the subject disclosure. At 810, method 800 can comprise receiving a touch input at a first part of a touch interface icon via a touch sensitive display, wherein the first part corresponds to an anatomical feature of an entity represented by the touch interface icon. As an example, a user can touch the touch sensitive display at a portion of the touch sensitive display corresponding to an anatomical feature of the entity represented by the touch interface icon, e.g., touching the ear of a caricature, wherein the ear relates to adapting a volume of presented content. A touch interface icon can comprise anatomical features associated with personification of the touch interface icon, for example, the touch interface icon can comprise eyes, ears, mouth, nose, etc., representing a face. Further, where the touch interface icon represents a stylized character, e.g., animal, robot, etc., the anatomical feature can relate thereto, e.g., animal tail, multiple legs, etc. As an example, a spider-type touch interface icon can have eight legs, and eight eyes. As another example, a robot-type touch interface icon can have an image of a speaker for a mouth.

At 820, method 800 can comprise determining an adaptation of the touch interface icon based on the touch input, wherein the adaptation comprises animation of the touch interface icon. The animation can provide nearly instant feedback that a portion of the icon is being interacted with, which can compensate for possible lag in effecting the actual control of the content being presented. As an example, touching the legs of the example spider touch interface icon can result in adapting the icon to cause the legs to 'crawl' in response to the touch, indicating to a user that the legs have been touched. Subsequent movement of the touch can result in the legs 'crawling forward' or 'crawling backwards' corresponding to the direction of the movement, and crawling faster or slower corresponding to the degree of the movement, e.g., the longer the movement the faster the spider can crawl in the selected direction, etc. Adapting the icon can comprise animation of the icon or portions thereof, including, adapting color(s) of the icon, adapting size/scale of the icon, changing an appearance of the icon, adding or removing visual elements to the icon, etc.

At 830, method 800 can comprise, generating content control data corresponding to the touch input, wherein the content control data is related to a functionality associated with the anatomical feature of the entity represented by the touch interface icon. Content control data can be employed by a content playback device to control presentation of content in accordance with content control data. Control of presented content can comprise fast forward, reverse, increasing or decreasing play speed, skip forward/backward, pause, play, volume up/down/mute, etc.

At 840, method 800 can include displaying the adaptation of the touch interface icon on the touch sensitive display and enabling access to the content control data to facilitate adapting presentation of the presented content. At this point method 800 can end. The adapting the presentation can be coordinated with the adaptation of the touch interface icon. The displaying the adaptation and enabling access to the content control data can occur contemporaneously. However, where there can be some lag in effecting a change in the presentation of the content, the adaptation of the touch interface icon can provide feedback during the lag that can indicate to a user which portion of the icon was touched. This can assure users that the correct functionality is being engaged despite possible lag in causing the presented content to undergo a command or control associated with the touch.

Figure 9:
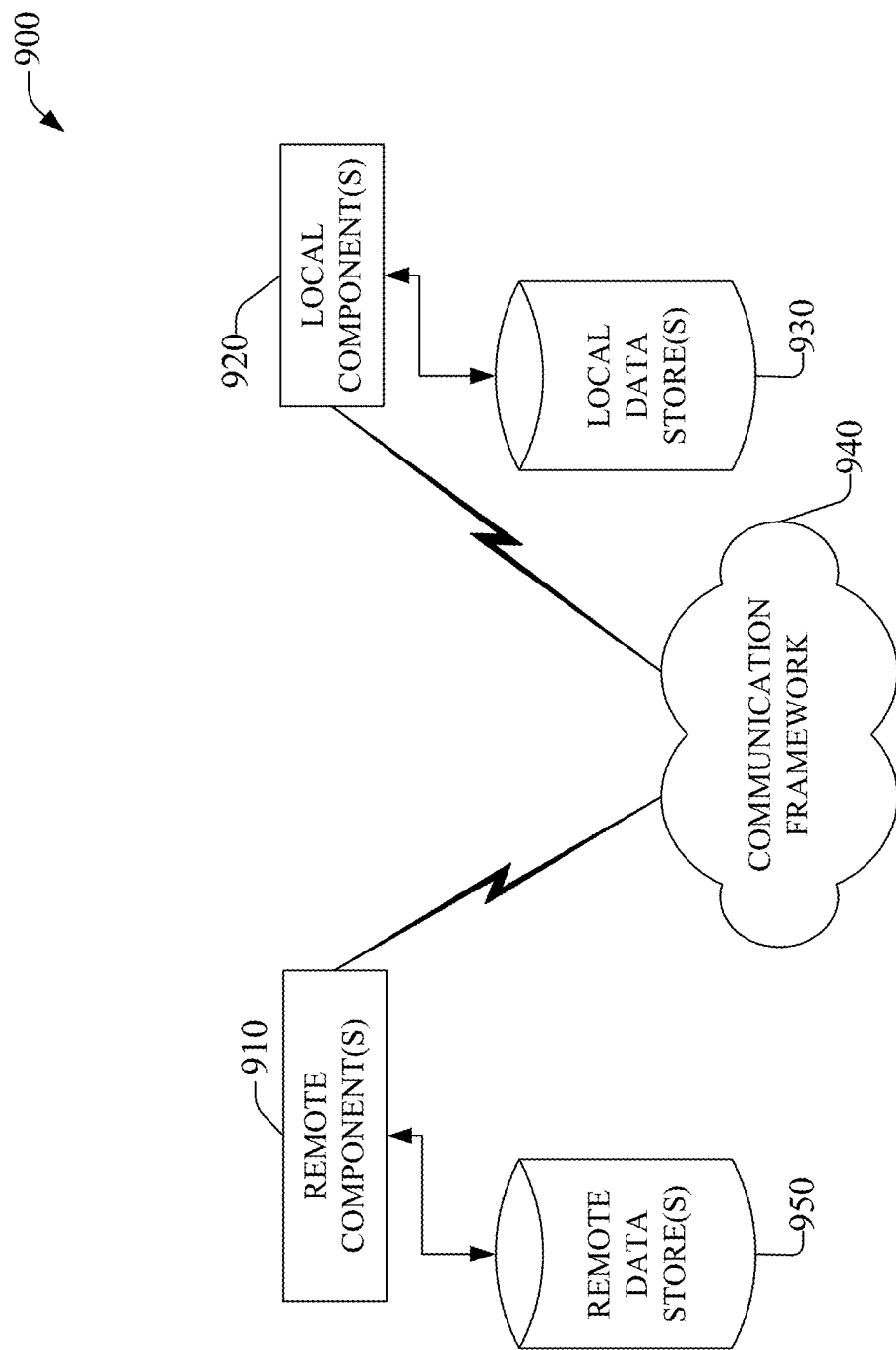
FIG. 9 depicts an example schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be interface icon library component 232, content source 306, TIIC 110, 210, 310, etc., touch sensitive display 350, etc.

The system 900 also includes one or more local component(s) 920. The local component(s) 920 can be hardware and/or software (e.g., threads, processes, computing devices). In some embodiments, local component(s) 920 can include, for example, interface icon library component 230, content source 306, TIIC 110, 210, 310, etc., touch sensitive display 350, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
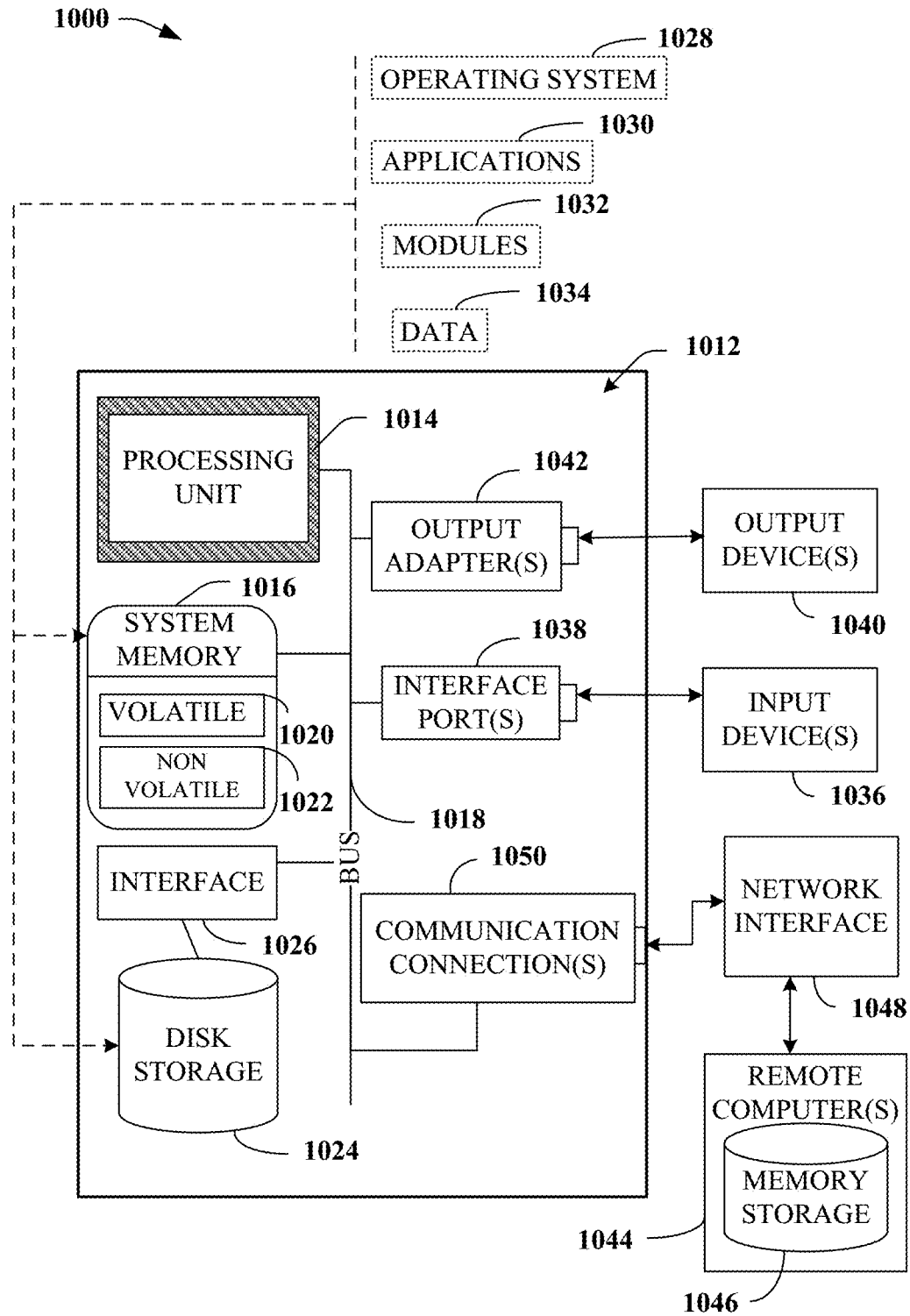
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory"

or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of THC 110,210, 310, etc., communication framework 212, etc., interface icon library component 323, etc., content source 306, etc., touch sensitive display 350, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving content data, e.g., via content source 306, etc., determining an icon based on the content data, e.g., via interface icon library component 230, 232, etc., receive control input via a display, e.g., 350, etc., and generate content control data.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of user preference information, etc., and can be embodied in a touch sensitive display panel, a mouse input GUI, a command line controlled interface, etc., allowing a user to interact with computer 1012. As an example, touch sensitive display 350, etc., TIIC 110, 210, 310, etc., can receive touch, motion, audio, visual, or other types of input. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, user input can be captured as touches to a touch sensitive interface, e.g., 350, etc., in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        rendering an icon overlaying a portion of a display area of a device, wherein the display area facilitates displaying visual content, wherein the icon comprises a first selectable portion, wherein the first selectable portion corresponds to a first anatomical feature of a non-human animal, wherein the icon is selected based on a correlation between the non-human animal and a characteristic determined to be associated with the visual content, and wherein the visual content is pre-recorded visual content; and
        in response to receiving an indication of a first interaction with the first selectable portion of the icon, performing a first action associated with the visual content.

2. The system of claim 1, wherein the icon further comprises a second selectable portion, wherein the second selectable portion of the icon corresponds to a second anatomical feature of the animal that is a different anatomical feature than the first anatomical feature, and wherein the operations further comprise, in response to receiving an indication of a second interaction with the second selectable portion of the icon, performing a second action associated with audio content corresponding to the visual content.

3. The system of claim 2, wherein the second action is adjusting a volume of the audio content corresponding to the visual content.

4. The system of claim 1, wherein the portion of the display area of the device is touch sensitive, and wherein the first interaction comprises a first touch selecting the first selectable portion of the icon.

5. The system of claim 4, wherein a second interaction comprises a touching motion from the first selectable portion of the icon to a second selectable portion of the icon.

6. The system of claim 5, wherein the touching motion from the first selectable portion of the icon to the second selectable portion of the icon corresponds to video scrubbing of the visual content.

7. The system of claim 1, wherein the icon is further selected based on user profile data from a user profile of a user identity currently associated with the device.

8. The system of claim 7, wherein the user profile data comprises historical content consumption data related to content determined to be previously consumed by the user identity currently associated with the device.

9. The system of claim 7, wherein the user profile data comprises user preference data related to preferences of the user identity currently associated with the device.

10. The system of claim 9, wherein the user preference data comprises an age corresponding to the age of the user identity currently associated with the device.

11. The system of claim 7, wherein the user profile data comprises human interface data related to a feature of a previous interaction by the user identity with a human interface device.

12. The system of claim 11, wherein the feature corresponds to a lack of dexterity of the user identity currently associated with the device.

13. The system of claim 11, wherein the feature corresponds to a lack of range of motion of the user identity currently associated with the device.

14. A device, comprising:
    a processor; and
    a memory that stores executable instructions that, when executed by the processor, facilitate performance of operations, comprising:
        determining a feature of content for presentation via a touch sensitive display, wherein the content is pre-recorded content;
        selecting an icon based on the feature of the content, wherein the icon comprises a first touch sensitive portion, wherein the icon is a non-human icon, and wherein the icon is displayed in an area of the touch sensitive display;
        receiving a touch of the first touch sensitive portion of the icon via the touch sensitive display, wherein the first touch sensitive portion of the icon corresponds to an anatomical feature of an animal;
        determining an instruction corresponding to the first touch sensitive portion of the icon, wherein the instruction is related to control of the content; and
        in response to applying the instruction to the content, causing the content to be controlled in accordance with the instruction.

15. The device of claim 14, wherein the feature of the content is a suggested consumer age range associated with the content, and wherein the selecting the icon results in selecting an adapted icon that is adapted to the suggested consumer age range.

16. The device of claim 14, wherein the instruction is one instruction of a group of instructions comprising fast forward, review, pause, play, volume up, volume down, scrub forward, scrub backward, skip forward, skip backward, and stop.

17. The device of claim 14, wherein the first touch sensitive portion of the icon corresponds to one of a group of anatomical features of the animal comprising an ear, an eye, a tail, and a mouth.

18. A method, comprising:
    determining, by a device comprising a processor and coupled to a touch sensitive display, a feature of pre-recorded content for presentation via the touch sensitive display;
    based on the feature of the pre-recorded content, selecting, by the device, a stylized icon, wherein the stylized icon comprises a first touch sensitive portion corresponding to a stylized anatomical feature of a non-human animal, and wherein the stylized icon is displayed in an area of the touch sensitive display;

in response to receiving an input at the first touch sensitive portion of the stylized icon via the touch sensitive display, determining, by the device, a corresponding instruction related to control of the pre-recorded content and, concurrently adapting the stylized icon to indicate the receiving the input at the first touch sensitive portion of the stylized icon; and initiating the control of the pre-recorded content in accordance with the corresponding instruction.

19. The method of claim 18, wherein the stylized icon comprises a portion of a cartoon animal character.

20. The method of claim 18, wherein the concurrently adapting the stylized icon comprises animating the first touch sensitive portion of the stylized icon.

* * * * *